United States Patent
Agrawal et al.

(10) Patent No.: US 12,182,430 B2
(45) Date of Patent: Dec. 31, 2024

(54) TRUSTED SYSTEMS FOR DECENTRALIZED DATA STORAGE

(71) Applicant: Western Digital Technologies, Inc., San Jose, CA (US)

(72) Inventors: Shashank Agrawal, San Jose, CA (US); Cyril Guyot, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 201 days.

(21) Appl. No.: 17/537,302

(22) Filed: Nov. 29, 2021

(65) Prior Publication Data

US 2023/0168825 A1   Jun. 1, 2023

(51) Int. Cl.
| | |
|---|---|
| G06F 3/06 | (2006.01) |
| G06F 21/10 | (2013.01) |
| G06F 21/60 | (2013.01) |
| G06F 21/64 | (2013.01) |

(52) U.S. Cl.
CPC .............. G06F 3/064 (2013.01); G06F 3/0622 (2013.01); G06F 3/0659 (2013.01); G06F 3/067 (2013.01); G06F 21/602 (2013.01); G06F 21/64 (2013.01); *G06F 21/107* (2023.08)

(58) Field of Classification Search
CPC ...... G06F 3/064; G06F 3/0622; G06F 3/0659; G06F 3/067; G06F 21/602; G06F 21/64; G06F 2221/0751
See application file for complete search history.

(56) References Cited

U.S. PATENT DOCUMENTS

| | | | |
|---|---|---|---|
| 8,978,155 B2 | 3/2015 | Erway et al. | |
| 9,571,287 B2 | 2/2017 | Narayanamurthy | |
| 10,169,616 B1* | 1/2019 | Nertney | G06F 21/602 |
| 10,554,407 B1* | 2/2020 | Greco | G06F 16/178 |
| 10,846,372 B1* | 11/2020 | Jayachandran | H04L 9/3239 |
| 11,017,036 B2 | 5/2021 | Jakobsson | |
| 11,387,984 B1* | 7/2022 | Valkaitis | H04L 9/0869 |

(Continued)

OTHER PUBLICATIONS

Le DP, Bonnecaze A, Gabillon A. Signtiming scheme based on aggregate signature. In2008 IEEE International Conference on Intelligence and Security Informatics Jun. 17, 2008 (pp. 145-149). IEEE. (Year: 2008).*

*Primary Examiner* — Michael R Vaughan
*Assistant Examiner* — Ethan V Vo
(74) *Attorney, Agent, or Firm* — PATTERSON + SHERIDAN, LLP (57) ABSTRACT

Certain aspects of the present disclosure provide techniques for proving possession of data in a storage device participating in a distributed data storage network. An example storage device includes a storage circuitry and a trusted circuit. The storage circuitry is configured to store a plurality of data blocks. The trusted circuit generally has a private signing key securely stored thereon. The trusted circuit is generally configured to compute a hash over data stored in a plurality of data blocks and to generate an anonymous digital signature for the data stored in the plurality of data blocks based at least in part on the private signing key and the computed hash. The trusted circuit may be interposed on a write path to the storage circuitry such that data written to the storage circuitry is processed through the trusted circuit.

22 Claims, 5 Drawing Sheets

(56) References Cited

U.S. PATENT DOCUMENTS

| | | | |
|---|---|---|---|
| 2012/0084519 A1* | 4/2012 | Vijayan | G06F 11/1453 |
| | | | 711/E12.103 |
| 2013/0326602 A1* | 12/2013 | Chen | G06F 21/64 |
| | | | 726/6 |
| 2015/0012745 A1* | 1/2015 | Hertel | H04L 67/563 |
| | | | 713/165 |
| 2015/0161154 A1* | 6/2015 | Gheith | G06F 16/182 |
| | | | 707/812 |
| 2015/0254020 A1* | 9/2015 | Taylor | G06F 3/067 |
| | | | 710/52 |
| 2016/0127366 A1* | 5/2016 | Yagisawa | H04L 63/0876 |
| | | | 713/176 |
| 2019/0068562 A1* | 2/2019 | Iyer | H04L 9/0637 |
| 2020/0026616 A1* | 1/2020 | Hu | G06F 11/2074 |
| 2020/0393975 A1* | 12/2020 | Pahwa | H04L 9/3239 |
| 2021/0141780 A1* | 5/2021 | Ahmed-Rengers | H04L 9/3242 |
| 2022/0247574 A1* | 8/2022 | Hoshino | H04L 9/3247 |
| 2022/0318415 A1* | 10/2022 | Fu | H04L 9/0866 |

\* cited by examiner

| Hash Value | Starting Address | Ending Address |
|---|---|---|
| ff760898795c | 0x00000001 | 0x00000100 |
| 249eee11e491 | 0x00000101 | 0x00000200 |
| b5b9f28771de | 0x00000201 | 0x00000300 |
| 787fee1e19f8 | 0x00000301 | 0x00000400 |
| 2830b5397515 | 0x00000401 | 0x00000500 |
| 6e33b344a960 | 0x00000501 | 0x00000600 |
| 3bdcec2a30bc | 0x00000601 | 0x00000700 |
| 6da88215dc51 | 0x00000701 | 0x00000800 |
| 79c29a7b515d | 0x00000801 | 0x00000900 |
| 696127a09313 | 0x00000901 | 0x00001000 |

TRUSTED SYSTEMS FOR DECENTRALIZED DATA STORAGE

Aspects of the present disclosure relate to distributed, decentralized data storage systems, and more specifically to trusted storage devices that can prove possession of data in the decentralized data storage system.

Blockchains can be used in various decentralized systems to provide a ledger of transactions that have occurred within these decentralized systems, including, for example, for cryptocurrency systems. Generally, a blockchain may include a chain of blocks, in which latest block includes some information about a transaction that occurred and a reference to an immediate predecessor block, which may be a hashed value of the previous block. Because the reference to the immediate predecessor block may be a value derived from the immediate predecessor block, verification of the transactions in the blockchain may be performed by ensuring that a hash of a block resolves to the same value as that stored as a reference to the immediate predecessor block in a succeeding block in the blockchain. If there is a mismatch between a computed hash of a block and the hashed value of the block in a succeeding block in the blockchain, validation of the blockchain may fail.

In some cases, blockchains can be used in a distributed storage network in which various storage devices on various computing devices can contribute storage capacity to the distributed storage network. In this case, the blockchain can be used to track data storage and/or retrieval transactions. Generally, a data storage transaction may specify that a specific piece of data, with a specific size, is to be stored on one or more storage devices in the distributed storage network. However, the blockchain itself may not guarantee that the piece of data specified in a storage transaction is actually stored in a given device and that the storage devices on which the data was stored have not re-allocated the space allocated for the piece of data for storage of other data in the distributed storage network.

Thus, techniques are needed to prove possession of data in distributed storage networks.

SUMMARY

Certain embodiments provide a storage device. The storage device generally includes a storage circuitry and a trusted circuit. The storage circuitry is configured to store a plurality of data blocks. The trusted circuit generally has a private signing key securely stored thereon. The trusted circuit is generally configured to compute a hash over data stored in a plurality of data blocks and to generate an anonymous digital signature for the data stored in the plurality of data blocks based at least in part on the private signing key and the computed hash. The trusted circuit may be interposed on a write path to the storage circuitry such that data written to the storage circuitry is processed through the trusted circuit.

Certain embodiments provide a method for generating signatures for data stored on a storage device participating in a distributed data storage network. An example method generally includes detecting a request to write data to one or more data blocks in storage circuitry of a storage device. A hash is computed over the data to be written to the one or more data blocks. An anonymous digital signature for the data to be written to the one or more blocks is generated based at least in part on a private signing key securely stored in a trusted circuit of the storage device and the computed hash. The anonymous digital signature is output from the storage device.

Certain embodiments provide a method for validating the existence of data stored on a storage device participating in a distributed data storage network. An example method generally includes receiving, from a requesting device at trusted circuitry of a storage device, a request for a signature for data stored in a range of memory addresses in storage circuitry of the storage device, the request including a challenge value. A hash of the data stored in the range of memory addresses is retrieved and signed using the challenge value. The signed hash is output to the requesting device.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for proving possession of data in a decentralized data storage system via trusted circuitry in a storage device.

In decentralized data storage systems, various devices can write data to and read data from participants in the decentralized data storage system. Generally, in writing data to the decentralized data storage system, a blockchain, or other distributed ledger, can be maintained including information about the data written to the decentralized data storage system (e.g., size of the data written to the decentralized data storage system in terms of a number of bits, a number of data blocks of a given size, etc.; a hash of the data written to the decentralized data storage system, and other information). As discussed, because blockchains are generally structured as a set of blocks, with each block referencing a prior block based on a hash of the prior block, the blockchain can immutably store a ledger of information identifying each transaction in the decentralized storage system. This ledger may be immutable because a hash of a block changes if any information in the block is changed; thus, to change a record in the blockchain, an infeasibly large number of blocks may need to be modified. These characteristics have led to blockchains being used to support the infrastructure of various cryptocurrencies.

One challenge in decentralized data storage systems is proving that any given participant device in the decentralized data storage system holds the data purported to be written to that participant device, as evidenced by a record in the blockchain, so that a client device that wrote data to the decentralized data storage system can ensure that the data can be retrieved on demand. That is, any participant in the decentralized data storage system may be required, as part of participating in the decentralized data storage system, to persist that data, and to not repurpose the storage blocks in which that data is stored, until such time as the owner of the data deletes that data from the decentralized data storage system.

Various techniques can be used to ensure that the data written to a decentralized data storage system is safe. In a decentralized data storage system operated by a single provider, an assumption that the data exists may be made based on trusting the single provider. However, in decentralized data storage systems where data is stored on storage devices for which ownership is unknown, this assumption may not be valid. In decentralized data storage systems where data is stored on storage devices for which ownership is unknown, one technique may include periodic retrieval of the data from the decentralized data storage system. However, this may waste a significant amount of network bandwidth and processing cycles, as a client device seeking to validate the existence of this data may periodically retrieve large amounts of data for no other purpose other than to validate that the data still exists in the decentralized data storage system. In another example, random pieces of the data may be retrieved periodically. However, retrieval of random pieces of data may not guarantee that the data actually exists in whole. To minimize the probability of data loss, then, larger amounts of data may be retrieved from the decentralized data storage system, which may still involve the use of significant amounts of bandwidth and processing cycles.

Another technique to ensure that data written to a decentralized data storage system is safe may involve various cryptographic techniques to prove the existence of the data. Succinct non-interactive zero-knowledge proofs need not involve any interaction between a provider and a verifier; rather, various cryptographic proofs, such as proofs of replication that mathematically prove the existence of some number of copies of data, or proofs of space-time that provide continuous storage, can be used to prove existence of the data in the decentralized data storage system. However, these proofs may be computationally expensive. A cryptographic proof may represent computation as an arithmetic circuit of addition and multiplication gates and involve one or more operations having a computational cost similar to that of public-key encryption per gate of the circuit. Because the cryptographic proof involves public-key cryptographic operations on a per-gate basis, the amount of time and computational resources needed to generate a proof may be significant (e.g., for a 1000-bit input and a 1-million-gate arithmetic circuit, over two minutes of computation time).

Decentralized data storage systems can form the technical underpinnings for cryptocurrencies, and the aforementioned technical issue of ensuring/verifying storage safety becomes an important issue in such systems. Filecoin is one such example cryptocurrency where any participant can contribute storage capacity to a storage network, and any client can store data in storage capacity contributed by the participants in the storage network. The Filecoin network operates a storage market and a retrieval market. The storage market allows clients to pay storage miners to store data while the retrieval market allows clients to retrieve data by paying retrieval miners to deliver the data. Regardless of whether a request is for data storage or retrieval, clients place bid orders and miners place ask orders. The network matches the orders in a decentralized and verifiable way to allow for data to be written to and retrieved from the storage network.

Any participant in the storage network can potentially store a client's data. The client would want to make sure that the data can be retrieved on demand, and thus, the provider who has stored the client's data (e.g., in response to the network having previously matched a client bid order to the provider's ask order) may be expected to store the data in a persistent manner. That is, for a given amount of storage space needed to store the client's data, the participant on which the client's data is stored may be expected to dedicate at least that given amount of storage space for the client. Further, this dedicated space should not be repurposed for any other purpose while the provider is still under contract to store the client's data.

To prove that the client's data exists in the storage network and ensure contracted storage space is not repurposed, succinct non-interactive zero-knowledge proofs can be used to build proof systems, which may be referred to as proofs of replication and proofs of space-time. A participant in the storage network can present a proof of replication to a client to mathematically prove to the client that the provider stores a certain number of copies of the client's data. A proof of space-time can be used to prove that a certain amount of data has been stored continuously for a certain period of time. However, generating these succinct non-interactive zero-knowledge proofs may be a computationally expensive process.

Aspects of the present disclosure provide techniques that efficiently prove the existence of data stored in a decentralized storage system using a trusted circuit in a storage device. In some embodiments, the trusted circuit in the storage device may be interposed on a write path to storage circuitry in which data is stored and may be configured to generate hashes and signatures of the data written to data blocks in the storage circuitry as data is written to the storage circuitry. In this manner, aspects of the present disclosure can generate data that can be used to evidence the storage of data in the storage device and to provide that the data is stored in the storage device during the write process instead of on-demand. When client devices request proof that data is stored on the storage device, the trusted circuit can provide a previously computed hash instead of reading the data from the storage circuitry and generating a proof that the data exists in the storage circuitry on-demand. By doing so, aspects of the present disclosure may reduce power utilization and processing time involved in proving the existence of data stored in a decentralized storage system, as proofs need not be computed each time a proof of existence is requested.

Further, in proving the current existence of data stored in the decentralized storage system, a match between a hash of a block in a blockchain, which may be periodically updated to ensure freshness of the signature, and a hash returned by the storage device in response to a request for proof of existence may prove that the data is currently stored in the decentralized storage system. Thus, distributed data storage systems can be made more computationally efficient, power utilization for devices participating in the distributed data storage system may be reduced, battery life of mobile devices participating in the distributed data storage system may be improved, and so on.

In addition, as mentioned above, certain cryptocurrencies are built upon such decentralized storage system schemes. Conventional storage devices typically do not have the proof generation capability to enable generation of proofs for data stored. Thus, certain embodiments of the disclosure are directed to storage devices having these described features with their proof generation efficiency advantages, so they can become trusted devices. This enables their participation into the overall storage scheme upon which the cryptocurrencies are built.

Figure 1:
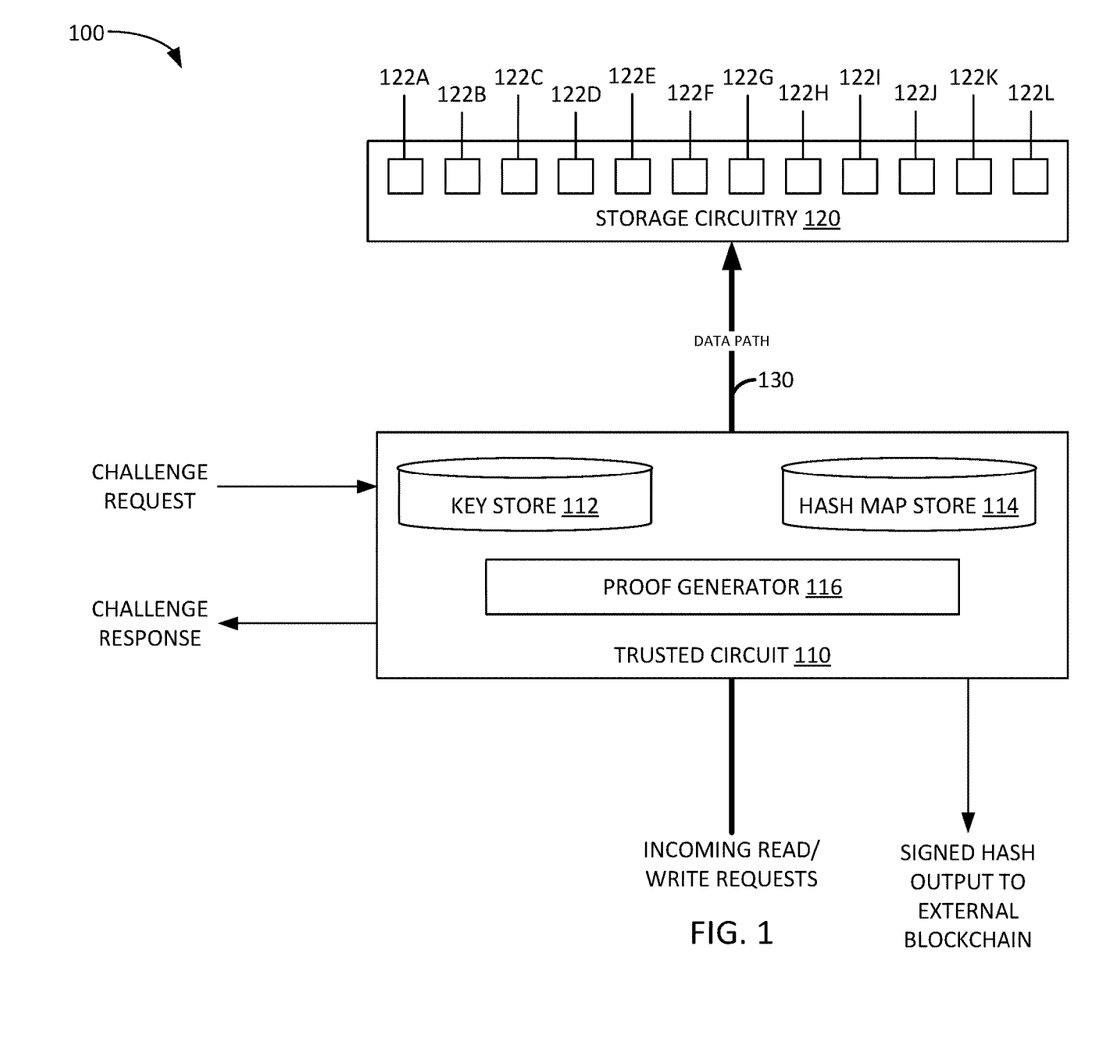
FIG. 1 illustrates a storage device having a trusted circuit for generating anonymous signatures for data stored on the storage device interposed on a write path to storage circuitry of the storage device.

Example Storage Device with Trusted Circuitry for Proving Existence of Data Stored on the Storage Device FIG. 1 depicts an example storage device 100 having a trusted circuit 110 for generating anonymous signatures for data stored on the storage device interposed on a write path to storage circuitry of the storage device, according to aspects of the present disclosure. Storage device 100 may be representative of a hard disk drive, a solid state drive, a non-volatile random access memory (NVRAM) device, or other storage device on which data may be persistently stored. As illustrated, storage device 100 includes a trusted circuit 110, storage circuitry 120, and a write path 130 on which data is transmitted for persistence to storage circuitry 120.

Trusted circuit 110 generally represents a circuit, such as a processor, that can generate signatures and hashes of data written to one or more data blocks 122A-L (collectively 122) in storage circuitry 120 for use in proving the existence of data stored on storage device 100. As illustrated, trusted circuit 110 may be interposed on write path 130 to storage circuitry 120. Because trusted circuit 110 may be interposed on write path 130, trusted circuit 110 can detect write events to the storage circuitry 120 and generate signatures and hashes of data written to the storage circuitry 120 when these write events are detected. As illustrated, trusted circuit 110 includes a key store 112, a hash map store 114, and a proof generator 116.

Key store 112 generally represents a data storage circuitry on which a private signing key associated with the storage device 100 is permanently stored. To ensure that the storage device 100 generates anonymous digital signatures using the same key, a private signing key may be permanently stored (e.g., "burned in") in key store 112 at manufacture time. In some aspects, the private signing key may be a key from a set of keys associated with a same public key, which may allow for storage device 100 to generate anonymous digital signatures using a key that identifies the storage device 100 as a device from a particular class of devices without exposing information about the storage device 100 itself. For example, the private signing key stored in key store 112 may be a key generated using the Enhanced Privacy Identifier (EPID) algorithm, or other algorithms in which large groups of private signing keys are associated with a same public key.

Hash map store 114 generally represents a data storage circuitry in which mappings of hashed versions of data to memory address ranges in which the data is stored may be maintained. As discussed in further detail below, entries in hash map store 114 may be generated when write events occur, and hashes may be retrieved from hash map store 114 when an external device requests verification that data is stored at storage device 100. In some aspects, hash map store 114 may be structured as a look-up table (LUT) in which hashes are associated with a starting memory address (e.g., a memory address of a data block 122 in storage circuitry 120 at which an initial portion of the data represented by the hash is stored) and an ending memory address (e.g., a memory address of a data block 122 in storage circuitry 120 at which a final portion of the data represented by the hash is stored).

Proof generator 116 generally is configured to generate anonymous digital signatures evidencing the storage of data to storage circuitry 120 and to validate the existence of data written to storage circuitry 120 upon request. As discussed, because trusted circuit 110 is interposed on write path 130 to storage circuitry 120, proof generator 116 may be configured to detect the occurrence of write events to storage circuitry 120 and generate anonymous digital signatures and hashes of the data included in the write event while such data is written to the storage circuitry 120. The generated anonymous digital signature may then be output from the storage device for recordation in a public blockchain, stored externally from the storage device 100, to record that data associated with a given hash has been stored on the storage device 100. The public blockchain may be, for example, related to or otherwise part of a cryptocurrency in which transactions (e.g., storage and/or retrieval) are recorded, and in which cryptocurrency is issued when the completion of such transactions is evidenced in the public blockchain.

Generally, to generate an anonymous digital signature evidencing the storage of data to storage circuitry 120, trusted circuit 110 can generate a hash of the data written to storage circuitry 120. Various techniques can be used to generate these hashes. For example, cryptographic hash algorithms, such as MD5, MD6, or SHA, can be used to generate a hash of the data written to storage circuitry 120. Generally, these hash algorithms are one-way algorithms in which a hash can be generated from a set of data, but the data cannot be (practically) recovered from the hash. Further, these hash algorithms generate different hashes for different sets of data input into the algorithm; any change in an input set of data will result in the generation of a different hash. The hash generated for the data written to storage circuitry 120 may then be signed using the private signing key stored in key store 112, and the anonymous digital signature may be output from the storage device, as discussed above. In some aspects, to further ensure the robustness of the signed hashes, the number of storage blocks over which the data was written may also be included in the anonymous digital signature evidencing the storage of data to storage circuitry 120. By including the total number of storage blocks over which the data was written in the anonymous digital signature evidencing the storage of data to storage circuitry 120, discarding blocks of data may result in the storage device subsequently being unable to generate a hash over the same number of blocks. Thus, the hash may not match the original hash generated when the data was written, and this mismatch may indicate to a client device that storage device 100 failed to maintain the data written to it.

In some aspects, proof generator 116 may use one or more additional pieces of data in generating anonymous digital signatures for data written to storage circuitry 120 to ensure "freshness" of the anonymous digital signature. That is, anonymous digital signatures may be re-generated from time to time so that the provision of a signed hash to the blockchain or to a requesting client device participating in the distributed data store system may indicate that the anonymous digital signature accurately reflects a current state of data stored in storage device 100 instead of some previous state that may or may not reflect the current state of the data stored in storage device 100. To ensure the "freshness" of the anonymous digital signature, in one aspect, proof generator 116 may use a clock or other time reference (e.g., from a host system) to obtain a current time. Both a timestamp corresponding to the current time and the hash may be signed using the private key in key store 112 and output to another device in the distributed data storage system. Because other devices in the distributed data storage system may have access to the corresponding public key to the private key in key store 112, the other devices can validate a signature of the signed timestamp and hash, and, based on the validated signature, the timestamp, and a threshold value (which may account for clock inaccuracies, drift, lack of clock synchronization across different devices in the distributed data storage system, etc.), determine that the anonymous digital signature is "fresh" if the timestamp is within the threshold value.

In another aspect, the current state of a blockchain (e.g., a blockchain related to or otherwise part of a cryptocurrency) in which transaction records for data written to the distributed data storage system can be used to ensure "freshness" of the anonymous digital signature. To use the current state of the blockchain to ensure "freshness" of the anonymous digital signature, proof generator 116 can retrieve the latest block persisted to the blockchain from the blockchain. For example, proof generator 116 can request, from another data store which may be local to or remote from the computing system on which storage device 100 is installed to which storage device 100 is connected, the latest block in the blockchain. Upon receiving or retrieving the latest block of the blockchain, proof generator 116 can sign information related to the latest block of the blockchain (e.g., the contents of the latest block of the blockchain, a hash of the latest block of the blockchain, etc.) and the hash of the data written to storage circuitry 120 using the private signing key stored in key store 112. The signed information related to the latest block of the blockchain and the signed hash of the data written to storage circuitry 120 can be output to participating devices in the distributed data storage system, and these participating devices can confirm that the anonymous digital signature is "fresh" or "stale" (e.g., outdated) by validating a signature of the signed latest block of the blockchain and identifying the age of the signed latest block of the blockchain relative to the actual latest block of the blockchain.

Storage device 100 may not be the only storage device to which data is written. For example, when a large data object is written to the distributed data storage system, participants in the distributed data storage system may be able to provide data blocks to store a portion of the large data object. Thus, multiple write operations, to multiple storage devices, may be performed in order to write the large data object to the distributed storage system. However, because these individual portions of the large data object are not independent write events, but are instead portions of a single write event, one anonymous digital signature generated for the large data object and persisted to the blockchain to evidence that the large data object has been written to one or more storage devices (including storage device 100) in the distributed data storage system.

To generate a single anonymous digital signature evidencing the completion of a write operation for a large data object, each participating storage device in the distributed data storage system can generate a three-tuple of (m, n, σ), where m represents a hash of a portion of the large data object written to the distributed data storage system, n represents an amount of the large data object provided to the storage device, and σ represents an individual signature generated for the portion of the blockchain m and the amount of the large data object provided to the storage device n. To generate the combined anonymous digital signature across each of the participating storage devices in the distributed storage system, the three-tuples of (m, n, σ) from each device may be combined into a single representation. For example, assume that a large data object written is written to storage device 100 and another storage device, thus generating the three-tuples $(m_1, n_1, \sigma_1)$ and $(m_2, n_2, \sigma_2)$. To generate the single anonymous digital signature to be written to the blockchain, a hash of $m_1 \| m_2$ may be generated (e.g., a hash of the concatenation of the values $m_1$ and $m_2$) and a hash of the sum of $n_1$ and $n_2$ may be generated (e.g., a hash of the total number of data blocks written to the distributed data storage system. The hash of $m_1 \| m_2$ and the hash of $n_1 + n_2$ may be signed using the private signing key stored in key store 112 to generate the single anonymous digital signature, and the single anonymous digital signature may be output to the blockchain to evidence completion of the write operation for this large data object.

In some aspects, signatures may be combinable across different pieces of data stored in storage circuitry 120 (and across different storage devices). For example, signatures may be combinable when timestamps associated with different signatures are within a threshold amount of time from each other. In another example, when signatures are associated with a challenge value, such as data derived from a current state of the blockchain in which information about data write events is stored, signatures are combinable when the challenge value is the same (e.g., references the same state of the blockchain). To generate a combined anonymous digital signature from a first signature associated with first data written to storage circuitry 120 and a second signature associated with second data written to storage circuitry 120, information carried within the signatures—such as a hash of a blockchain or Merkel tree and a number of data blocks associated with the first and the second signatures—may be concatenated, and the concatenated data may be signed using the private signing key stored in key store 112.

Trusted circuit 110 generally is configured to prove the existence of data in storage circuitry 120 when requested to do so by a participating device in the distributed data storage system. Generally, a participating device in the distributed data storage system can transmit a challenge to the storage device 100 including a challenge value to be used in signing the hash of the data for which verification is requested. The challenge may also include information identifying the location of the data in the storage device, such as a memory address. Trusted circuit 110 can use the hash-address map stored in hash map store 114 to determine whether a hash has been pre-computed for the memory address. In some aspects, the hash may be associated with a starting and an ending memory address associated with specific storage blocks in storage circuitry 120. If the address included in the challenge is within a range of addresses in the hash-address map, trusted circuit can use the hash associated with the range of addresses to generate a response to the challenge. The response may include, for example, the hash associated with the range of addresses, signed using the challenge value provided to trusted circuit 110 by the participating device in the distributed data storage system that is requesting validation of the data stored at storage device 100.

If, however, the memory address is not associated with a range of addresses already stored in the hash-address map, a hash may need to be computed for the data stored at the memory address specified in the challenge. To generate the hash, trusted circuit 110 may read the data at the memory address specified in the challenge (and, in some aspects, data near the memory address specified in the challenge). The data read from the memory address in storage circuitry 120 may be hashed and signed (e.g., using the private signing key stored in key store 112 and/or a challenge value included in a request to validate the existence of data in storage device 100), and the signed hash may be returned to the participating device in the distributed data storage system that requested validation of the data at the memory address. In some aspects, a new entry may be added to the hash-address map to allow for subsequent requests to validate the existence of data at the specified memory address to be completed without reading the data from data blocks 122 in the storage circuitry 120.

To maintain the map and ensure that the map includes hashes corresponding to the latest state of the data stored in storage circuitry 120, entries in the map may be invalidated as data is deleted or updated. Generally, when write events are intercepted on write path 130, proof generator 116 can examine the memory addresses specified in the write events to determine whether a mapping exists in hash-address map for those memory addresses. If the memory addresses specified in the write events are within a range of addresses associated with a hash in the hash-address map, the entry in the hash-address map associated with the range of addresses may be deleted.

Storage circuitry 120 generally represents circuitry in which data can be stored in storage device 100. As illustrated, storage circuitry 120 includes a plurality of data blocks 122A-122L (though it should be understood that storage circuitry 120 may include any number of storage blocks, and the illustration of data blocks 122A-122L is only illustrative). Each data block 122 represents a discrete portion of storage circuitry 120 in which data can be stored. For example, a data block 122 may represent one or more cells in a solid state memory device, each cell being capable of storing any number of bits (e.g., a single-level cell capable of storing one bit in the cell; a dual-level cell capable of storing two bits in the cell; a triple-level cell capable of storing three bits in the cell, etc.), or a sector in a track of storage media such as in a hard disk drive. Each data block 122 may be associated with a memory address or range of memory addresses. Read operations directed to a memory address associated with a data block 122A-122L may cause the retrieval of data from the appropriate data block 122A-122L, and write operations directed to a memory address associated with a data block 122A-122L may cause data to be written to the appropriate data block 122A-122L. As data is written to data blocks 122 in storage circuitry 120, trusted circuit 110 can generate anonymous digital signatures for the data written to data blocks 122, as discussed above.

Figure 2:
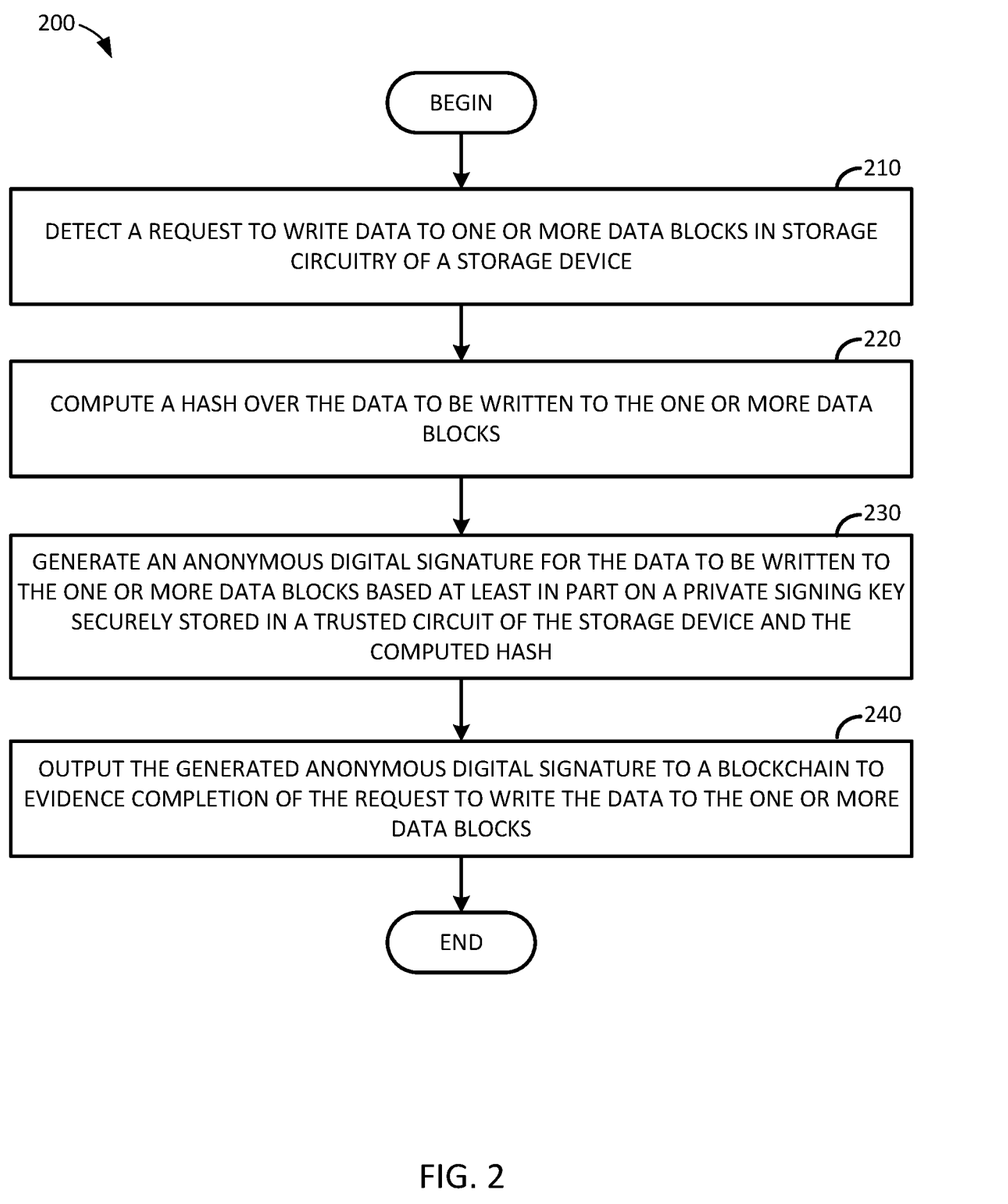
FIG. 2 illustrates example operations for generating an anonymous signature for data stored on a storage device based on a hash of the data and a private signing key securely stored in a trusted circuit interposed on a write path to storage circuitry in the storage device.

Example Computer-Implemented Method for Generating Anonymous Digital Signatures for Data Written to a Storage Device Using a Trusted Circuit FIG. 2 illustrates example operations 200 that may be performed by a trusted circuit of a storage device (e.g., trusted circuit 110 illustrated in FIG. 1) to generate anonymous digital signatures for data written to a storage device, in accordance with aspects of the present disclosure. As discussed, these anonymous digital signatures may be output for storage in a blockchain associated with a distributed data storage system in which information about data write transactions is persisted so that other participating devices in the distributed data storage system can see that data was written to the distributed data storage system. The blockchain may be, for example, related to or otherwise part of a cryptocurrency in which transactions (e.g., storage and/or retrieval) are recorded and in which cryptocurrency is issued when the completion of such transactions is evidenced in the blockchain. A participating device in the distributed data storage system can use a hash included in the anonymous digital signature to validate the existence of data in the storage device, as discussed above and described in further detail below with respect to FIG. 4. Further, these anonymous digital signatures may be signed using one of a plurality of private signing keys associated with a given public key, which may prevent other identification of a specific device in the distributed data storage system on which specific data is stored.

Operations 200, as illustrated begin at block 210, where the trusted circuit detects a request to write data to one or more data blocks in storage circuitry. As discussed, the trusted circuit can detect the request to write data to the one or more data blocks in storage circuitry because the trusted circuit may be interposed on the write path. Thus, the trusted circuit can detect signaling transmitted to the storage circuitry on this write path, and the detection of this signaling may trigger execution of operations 200.

In some aspects, the request to write data to the one or more data blocks in storage circuitry may include the data to be written, memory addresses to which the data is to be written, a size of the data to be written, and/or other information that may be used to generate a signature evidencing completion of a write operation for the data specified in the request. The data included in the request may be unencrypted data or may be encrypted data. For example, when multiple copies of data are to be written, each copy may be encrypted using a different cryptographic key, which may result in a storage device allocating space for each copy of the multiple copies of the data to be written, as each copy may have a same size but appear to have different content. In another case, when data written to the distributed data storage system is sourced from two different participants sharing a same root node in a blockchain evidencing transactions in the distributed data storage system, the use of encrypted data from each of the different participants may force the storage of separate copies of the data, which may prevent data loss from storing data from one of the sub-trees of the root node. To preserve the privacy of the data, the trusted circuit may not receive any information about the keys used to encrypt the data to be written and may treat the data as a raw bitstream from which hashes are to be generated.

At block 220, the trusted circuit computes a hash over the data to be written to the one or more data blocks in storage circuitry. The hash may be computed using a variety of one-way hashing algorithms in which a compressed representation of the data to be written to the one or more data blocks in storage circuitry may be generated, but the data cannot be recovered from the hash. Further, the one-way hashing algorithms may be designed such that any change to the data, however small, will result in the generation of a different hash so as to minimize a "hash collision" problem in which different input data resolves to the same hash.

At block 230, the trusted circuit generates an anonymous digital signature for the data to be written to the one or more data blocks in storage circuitry. Generally, to generate the anonymous digital signature, the trusted circuit can use a private signing key stored in the trusted circuitry (e.g., burned into the trusted circuit at the time of manufacture or persisted to the trusted circuit during firmware updates, etc.) to sign the computed hash for the data and the number of data blocks over which the data is stored. In some aspects, anonymity of the digital signature may be guaranteed based on cryptographic properties of the private signing key. For example, the private signing key may be a key in a large group of keys that share a same public key used to validate a signature of data signed using any key in the large group of keys, and the public key may be associated with a large class of devices (e.g., mass storage devices) from which an individual member of the large class of devices cannot be identified. Because the public key is not associated with any specific private signing key assigned to a specific device, the anonymity of the storage device including the trusted circuit that generated the anonymous digital signature may be assured. Further, because the hash may be encrypted using the private signing key, the hash itself may be protected in transit and at rest, which may prevent other parties from learning information about the data (e.g., through side channel information leaked from a hash).

In some aspects, generating the anonymous digital signature for the data to be written to the one or more data blocks in storage circuitry may include combining signatures from multiple storage devices. To generate the anonymous digital signature across multiple storage devices, information about what was written at each of the multiple storage devices may be aggregated. For example, each storage device may be associated with its own Merkel sub-tree, or hash tree, in the overall blockchain. The Merkel sub-tree associated with a storage device may represent the totality of data write operations performed against that storage device. Aggregating information across the storage devices to which different portions of a larger data object was written may thus include generating a hash over the Merkel sub-tree associated with each storage device. To do so, the hashes of the Merkel sub-trees may be concatenated, and the concatenation of these hashes may be signed using the private signing key stored in the trusted circuitry. The number of data blocks used to store the data object in each of the multiple storage devices may also be concatenated, and the concatenation of the number of data blocks may also be signed using the private signing key stored in the trusted circuitry.

In some aspects, generating the anonymous digital signature may include combining signatures determined to be combinable by the trusted circuit of a storage device. These signatures may include, for example, signatures generated for transactions having timestamps within a threshold amount of time from each other or for transactions associated with a same challenge value (e.g., the same state of the blockchain at the time the transaction was generated). To combine the signatures, the trusted circuit can concatenate hashes and numbers of blocks in each signature, and sign the concatenated hashes and the concatenated number of blocks. The signed concatenated hashes and the signed concatenated number of blocks may be output as the anonymous digital signature generated for the data written to the storage circuit.

At block 240, the anonymous digital signature is output to a blockchain. Outputting the anonymous digital signature to a blockchain may evidence completion of the request to write the data to the one or more blocks in the storage circuitry of the storage device. As discussed, the anonymous digital signature may be generated based, at least in part, on a hash of the data written to the storage circuitry in the storage device. Because the hash can be recovered from the digital signature, the hash can be used by any participating device in the distributed data storage system to validate the existence of data in the distributed data storage system.

For example, a device that generated the write request may receive a pointer (e.g., a memory address) identifying a location of the data in the distributed data storage system (or a plurality of pointers identifying locations of the data across different storage devices, if distributed across multiple devices in the distributed data storage system). As discussed in further detail below, this pointer can be used to retrieve a hash of the data from the storage device. If the retrieved hash and the hash included in the digital signature in the blockchain match, a participating device in the distributed data storage system can verify that the data purported to have been written to the distributed data storage system actually exists at the specified address in the distributed data storage system.

Example Hash-Address Map and Verification of Data Stored in Storage Circuitry

Figure 3:
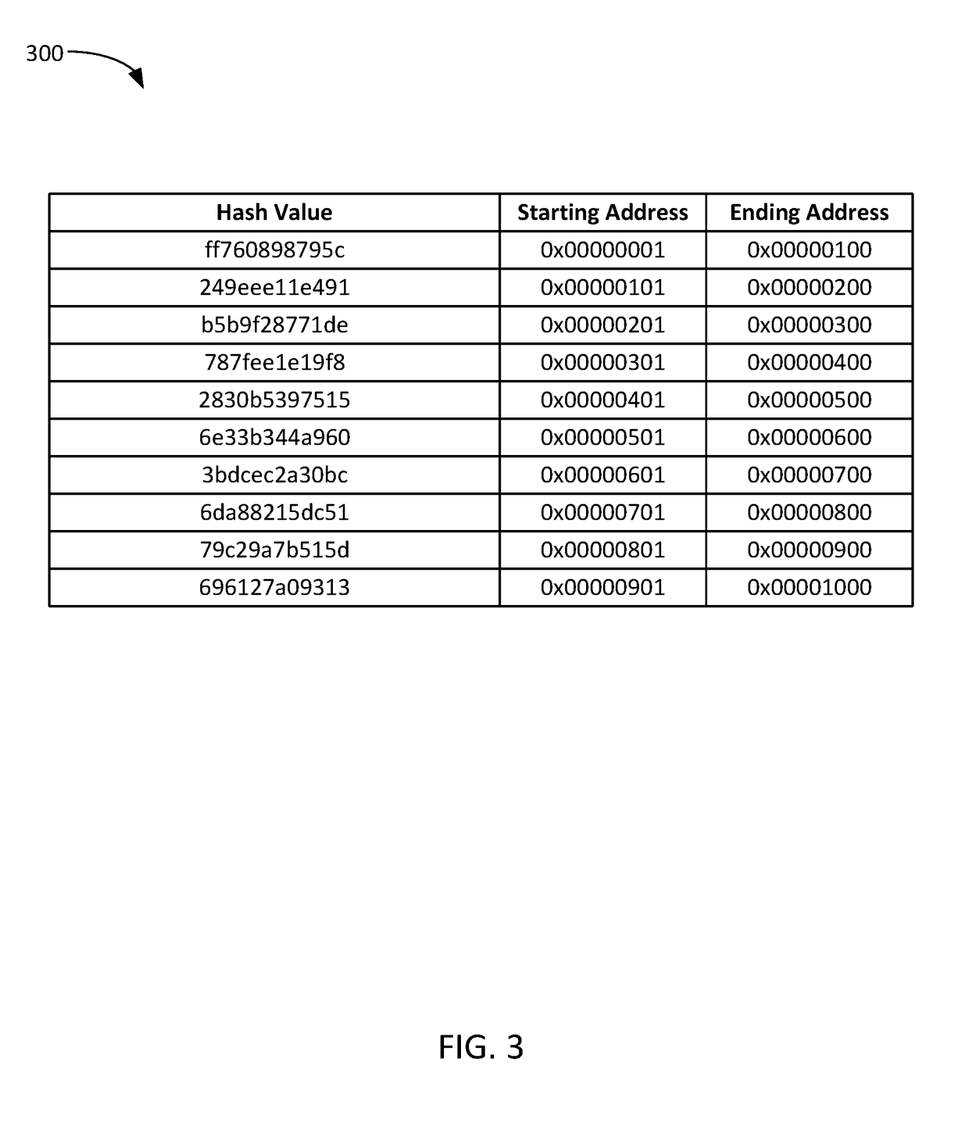
FIG. 3 illustrates an example hash-address map including mappings of ranges of memory addresses to computed hashes of the data stored in ranges of memory addresses.

FIG. 3 illustrates an example hash-address map 300 that can be used, in part, to verify the existence of data stored in storage circuitry of the storage device, in accordance with aspects of the present disclosure.

Hash-address map 300 may be stored, for example, in hash map store 114 illustrated in FIG. 1 and may be used by a proof generator of a trusted circuit (e.g., proof generator 116 of trusted circuit 110 illustrated in FIG. 1) to satisfy challenges, or validation requests, for data stored in the storage device. As illustrated, hash-address map 300 includes a plurality of entries. Each entry in the hash-address map includes a hashed value of the data associated with the entry, a beginning address, and an ending address in the storage circuitry at which the data associated with the entry is stored. In this example, each entry may span 256 (0x100) data blocks; however, it should be recognized that an entry in hash-address map 300 may include a hash spanning any number of data blocks.

As discussed, when a participating device in the distributed data storage system generates a challenge to verify the existence of data in the distributed data storage system, the participating device may transmit a query including an address at which the data is expected to be located to the storage device on which the data is expected to be located. The trusted circuit can use the memory address included in the challenge to search the hash-address map 300 for a hash associated with a range of memory addresses in which the memory address included in the challenge lies. If a match is found, the trusted circuit can return the hash (which may be signed using some other information included in the challenge) without executing read operations against storage bocks in the storage circuitry of the storage device. For example, assume that a challenge specifies that data is located in the range of memory addresses starting at 0x00000701 and ending at 0x00000800. Because this memory address lies within the range of memory addresses 0x00000701 and 0x00000800, a trusted circuit can return the hash "6da88215dc51" without reading data located at the specified memory address. Because the hash of the data located at this memory address can be retrieved without reading data located at the specified memory address, outputting the hash to a requesting device may omit the processing overhead involved in reading data from storage circuitry at the storage device and generating a hash over the read data, thus improving the efficiency of operations involved in generating and returning proofs of storage in the distributed data storage system.

Figure 4:
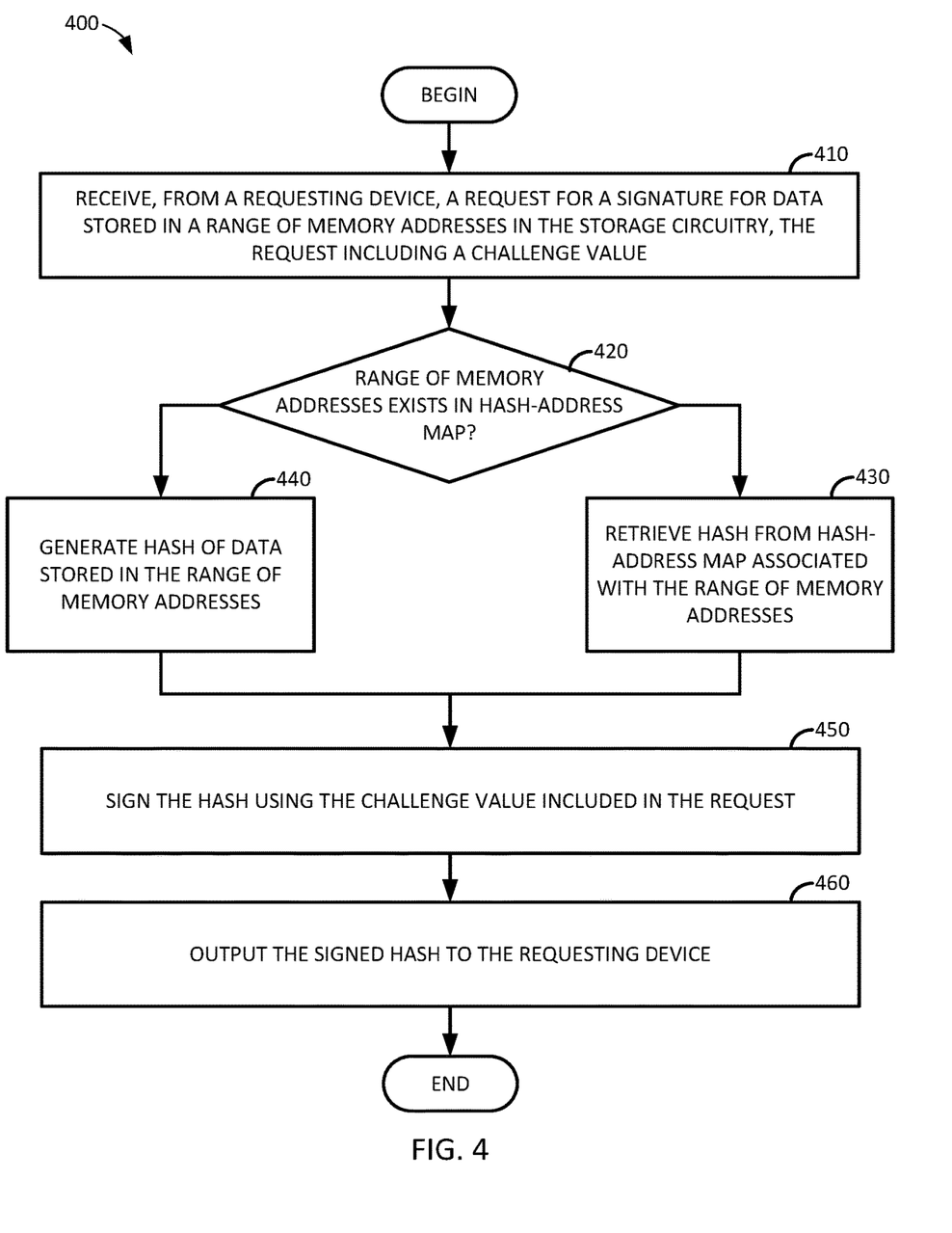
FIG. 4 illustrates example operations for validating the presence of data at a memory address in the storage device based on a hash-address map.

FIG. 4 illustrates example operations 400 that may be performed that may be performed by a trusted circuit of a storage device (e.g., trusted circuit 110 illustrated in FIG. 1) to validate the existence of data stored on a storage device in a distributed data storage system, in accordance with aspects of the present disclosure.

As illustrated, operations 400 may begin at block 410, where a request is received for a signature for data stored in a range of memory addresses in storage circuitry of a storage device. The request may include a challenge value which the trusted circuit can use to sign a hash of the data purportedly stored at the memory address in the storage circuitry of the storage device.

At block 420, the trusted circuit determines whether the range of memory addresses exists in a hash-address map (e.g., map 300 from FIG. 3). As discussed, the hash-address map may include a plurality of entries in a hash-address map table, with each entry associating a range of memory addresses with a hash of data located at that memory address.

If, at block 420, the trusted circuit finds an entry in the hash-address map with the range of memory addresses identified in the request, operations 400 may proceed to block 430. At block 430, a hash is retrieved from the hash-address map. The retrieved hash is generally associated with the range of memory addresses specified in the request.

Otherwise, if at block 420, the trusted circuit does not find an entry in the hash-address map associated with the range of memory addresses identified in the request, operations 400 may proceed to block 440.

At block 440, the trusted circuit generates a hash of data stored in the range of memory addresses specified in the request. In some aspects, after generating the hash of data stored in the specified range of memory addresses, the trusted circuit can add an entry to the hash-address map to facilitate rapid satisfaction of future validation requests, which may reduce the amount of processing cycles and bandwidth needed to process validation requests. The entry to the hash-address map may include the generated hash, a starting memory address at an earliest memory address of the range of memory addresses specified in the request, and an ending memory address at a final memory address of the range of memory addresses specified in the request.

Operations 400 may proceed from either block 430 or block 440 to block 450, where the hash is signed using the challenge value included in the request. The challenge value may include, for example, a value derived from the current state of a blockchain evidencing transactions performed in the distributed data storage system, a key generated by the requesting device, or other information that can be used to sign the hash and a number of data blocks over which the hash was generated. The blockchain may be, for example, related to or otherwise part of a cryptocurrency in which transactions (e.g., storage and/or retrieval) are recorded and in which cryptocurrency is issued when the completion of such transactions is evidenced in the blockchain.

At block 460, the signed hash is output to the requesting device. The requesting device may be, for example, a laptop computer, a desktop computer, a mobile device, or other computing device from which data can be offloaded for storage in the distributed data storage system and from which requests to prove the existence of data on a storage device in the distributed data storage system can be issued.

Example Processing Device

Figure 5:
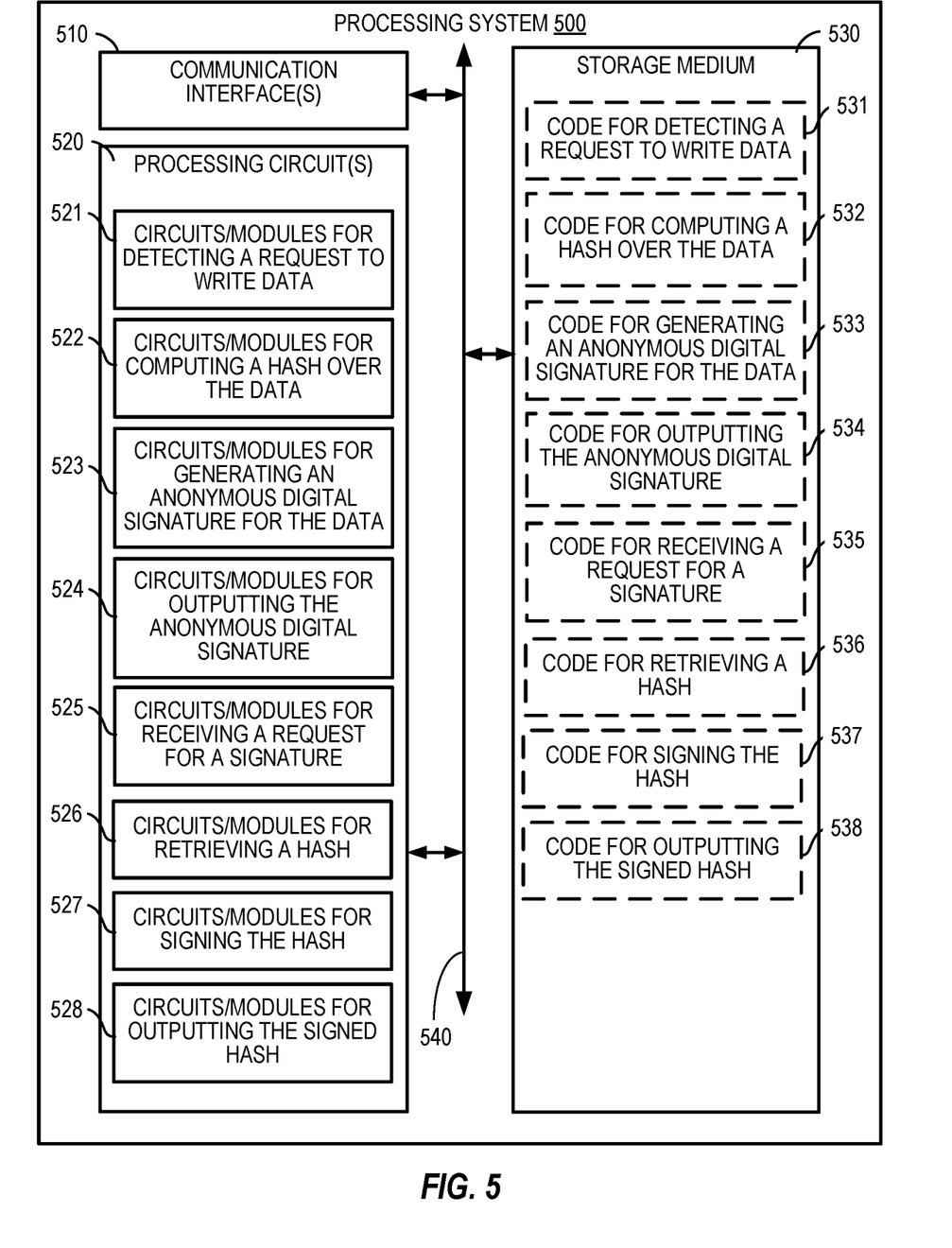
FIG. 5 illustrates an example system on which embodiments of the present disclosure can be performed.

FIG. 5 depicts an example processing system 500, which may be configured to perform the various aspects described herein, including the methods described with respect to FIGS. 2 and/or 4.

Processing system 500, or components thereof, could embody or be implemented within a server computer, desktop computer, workstation, tablet computer, smartphone, smart wearable device, internet of things (IoT) device, edge processing device, personal digital assistant, digital camera, digital phone, entertainment device, medical device, self-driving vehicle control device, data storage device, controller device, host device, or some other type of device that processes data.

Processing system 500 includes a communication interface(s) 510, processing circuit(s) 520 (e.g., at least one processor and/or other suitable circuitry), and storage medium 530 (e.g., a non-volatile memory). These components can be coupled to and/or placed in electrical communication with one another via a signaling bus 540 or other suitable component, represented generally by the connection lines in FIG. 5. The signaling bus 540 may include any number of interconnecting buses and bridges depending on the specific application of the processing circuit(s) 520 and the overall design constraints. The signaling bus 540 links together various elements such that each of the communication interface 510, the processing circuit(s) 520, and the storage medium 530 are coupled to and/or in electrical communication with each other. The signaling bus 540 may also link various other circuits (not shown) such as timing sources, peripherals, voltage regulators, and power management circuits, which are well known in the art, and therefore, will not be described any further.

The communication interface 510 provides a means for communicating with other devices or apparatuses over a transmission medium. In some implementations, the communication interface 510 includes circuitry and/or programming (e.g., a program) adapted to facilitate the communication of information bi-directionally with respect to one or more devices in a system. In some implementations, the communication interface 510 may be configured for wire-based communication. For example, the communication interface 510 could be a bus interface, a send/receive interface, or some other type of signal interface including drivers, buffers, or other circuitry for outputting and/or obtaining signals (e.g., outputting signal from and/or receiving signals into an integrated circuit). The communication interface 510 serves as one example of a means for receiving and/or a means for transmitting.

The storage medium 530 may represent one or more computer-readable, machine-readable, and/or processor-readable devices for storing programming, such as processor executable code or instructions (e.g., software, firmware), electronic data, databases, or other digital information. The storage medium 530 may also be used for storing data that is manipulated by the processing circuit(s) 520 when executing programming. The storage medium 530 may be any available media that can be accessed by a general purpose or special purpose processor, including portable or fixed storage devices, optical storage devices, and various other mediums capable of storing, containing or carrying programming.

By way of example and not limitation, the storage medium 530 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, ReRAM, a register, a removable disk, and any other suitable medium for storing software and/or instructions that may be accessed and read by a computer. The storage medium 530 may be embodied in an article of manufacture (e.g., a computer program product). By way of example, a computer program product may include a computer-readable medium in packaging materials. In view of the above, in some implementations, the storage medium 530 may be a non-transitory (e.g., tangible) storage medium. For example, the storage medium 530 may be a non-transitory computer-readable medium storing computer-executable code, including code to perform operations as described herein.

The storage medium 530 may be coupled to the processing circuit(s) 520 so that the processing circuit 520 can read information from, and write information to, the storage medium 530. That is, the storage medium 530 can be coupled to the processing circuit(s) 520 so that the storage medium 530 is at least accessible by the processing circuit(s) 520, including examples where at least one storage medium is integral to the processing circuit(s) 520 and/or examples where at least one storage medium is separate from the processing circuit(s) 520 (e.g., resident in the apparatus 500, external to the apparatus 500, distributed across multiple entities, etc.).

Programming stored by the storage medium 530, when executed by the processing circuit(s) 520, causes the processing circuit(s) 520 to perform one or more of the various functions and/or process operations described herein. For example, the storage medium 530 may include operations configured for regulating operations at one or more hardware blocks of the processing circuit(s) 520, as well as to utilize the communication interface(s) 510 for wireless communication utilizing their respective communication protocols.

At least some of the processing circuits described herein are generally adapted for processing, including the execution of such programming stored on a storage medium such as storage medium 530. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein are arranged to obtain, process and/or send data, control data access and storage, issue commands, and control other desired operations. For example, the processing circuits may include circuitry configured to implement desired programming provided by appropriate media in at least one example.

For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuits may also be implemented as a combination of computing components, such as a combination of a controller and a microprocessor, a number of microprocessors, one or more microprocessors in conjunction with an ASIC and a microprocessor, or any other number of varying configurations. These examples of processing circuits are for illustration and other suitable configurations within the scope of the disclosure are also contemplated.

According to one or more aspects of the disclosure, the processing circuit(s) 520 may be adapted to perform any or all of the features, processes, functions, operations and/or routines for any or all of the methods described herein. For example, the processing circuit(s) 520 may be configured to perform any of the steps, functions, and/or processes described with respect to FIGS. 2 and/or 4. As used herein, the term "adapted" in relation to the processing circuit(s) 520 may refer to the processing circuit(s) 520 being one or more of configured, employed, implemented, and/or programmed to perform a particular process, function, operation and/or routine according to various features described herein. The processing circuit(s) 520 may be a specialized processor, such as an ASIC that serves as a means for (e.g., structure for) carrying out any one of the operations described in conjunction with FIGS. 2 and/or 4. The processing circuit(s) 520 serves as one example of a means for processing.

According to at least one example of the apparatus 500, the processing circuit(s) 520 may include one or more of: a circuit/module 521 for detecting a request to write data; a circuit/module 522 for computing a hash over the data; a circuit/module 523 for generating an anonymous digital signature from the data, for example, using the computed hash; a circuit/module 524 for outputting the anonymous digital signature; a circuit/module 525 for receiving a request for a signature; a circuit/module 526 for retrieving a hash; a circuit/module 527 for signing the hash; and a circuit/module 528 for outputting the signed hash. Notably, these are just some examples, and others are possible based on the various aspects described herein.

As mentioned above, a program stored by the storage medium 530, when executed by the processing circuit(s) 520, causes the processing circuit(s) 520 to perform one or more of the various functions and/or process operations described herein. For example, the program may cause the processing circuit(s) 420 to perform and/or control the various functions, steps, and/or processes described herein with respect to FIGS. 2 and/or 4.

As shown in FIG. 5, the storage medium 530 may include one or more of: code 531 for detecting a request to write data; code 532 for computing a hash over the data; code 533 for generating an anonymous digital signature for the data; code 534 for outputting the anonymous digital signature; code 535 for receiving a request for a signature; code 536 for retrieving a hash; code 537 for signing the hash; and code 538 for outputting the signed hash. Notably, these are just some examples, and others are possible based on the various aspects described herein.

In at least some examples, the various circuits/modules in 520 as well as other processing elements described herein may comprise means for performing the various functions described herein, including the functions enabled by the various codes stored in storage medium 530.

Example Clauses

Clause 1: A storage device, comprising: a storage circuitry configured to store a plurality of data blocks; and a trusted circuit having a private signing key securely stored thereon, the trusted circuit being configured to: compute a hash over data stored in a plurality of data blocks, and generate an anonymous digital signature for the data stored in the plurality of data blocks based at least in part on the private signing key, the computed hash, and a number of the plurality of data blocks in which the data is stored; wherein the trusted circuit is interposed on a write path to the storage circuitry such that data written to the storage circuity is processed through the trusted circuit.

Clause 2: The storage device of Clause 1, wherein the trusted circuit is configured to generate the anonymous digital signature further based on a time at which the digital signature is generated.

Clause 3: The storage device of any one of Clauses 1 or 2, wherein the trusted circuit is further configured to: derive a challenge value related to a most recent state of a blockchain associated with the data stored in the plurality of data blocks; and generate a second anonymous signature based on the private signing key and the challenge value.

Clause 4: The storage device of Clause 3, wherein the blockchain is associated with a cryptocurrency.

Clause 5: The storage device of any one of Clauses 1 through 4, wherein the trusted circuit is further configured to maintain a mapping between a memory address range associated with the plurality of data blocks and the computed hash.

Clause 6: The storage device of Clause 5, wherein the trusted circuit is further configured to: receive, from a requesting device, a request to validate existence of data at a memory address; determine that the memory address is within the memory address range associated with the plurality of data blocks; and return, to the requesting device, the computed hash.

Clause 7: The storage device of any one of Clauses 5 or 6, wherein the trusted circuit is further configured to: receive, from a requesting device, a request to validate existence of data at a memory address; determine that the memory address is outside the memory address range associated with the plurality of data blocks; read, from the storage circuitry, data stored at the memory address; generate a second anonymous digital signature for the data stored at the memory address based on a hash of the data stored at the memory address and a signing key; and return, to the requesting device, the second anonymous digital signature.

Clause 8: The storage device of Clause 7, wherein the trusted circuit is further configured to: generate a second mapping, the second mapping associating the memory address and the hash of the data stored at the memory address.

Clause 9: The storage device of any one of Clauses 7 or 8, wherein the signing key comprises the private signing key.

Clause 10: The storage device of any one of Clauses 7 through 9, wherein the signing key comprises a challenge value included in the request to validate existence of data at the memory address.

Clause 11: The storage device of any one of Clauses 5 through 10, further comprising: detecting, on the write path to the storage circuitry, a write request against an address in the memory address range associated with the plurality of data blocks; and deleting the mapping between the memory address range associated with the plurality of data blocks and the computed hash based on detecting the write request.

Clause 12: The storage device of any one of Clauses 1 through 11, wherein the trusted circuit is further configured to: receive a first digital signature for first data to be stored in the storage circuitry and a second digital signature for second data to be stored in the storage circuitry; determine, based on information associated with the first digital signature and the second digital signature, that the first digital signature and the second digital signature are combinable; and based on a determination that the first digital signature and the second digital signature are combinable, generate a combined signature for the first digital signature and the second digital signature.

Clause 13: The storage device of Clause 12, wherein in order to determine that the first digital signature and the second digital signature are combinable, the trusted circuit is configured to: determine that a timestamp associated with the first digital signature differs from a timestamp associated with the second digital signature by an amount less than a first threshold amount, and determine that the timestamp associated with the first digital signature and the timestamp associated with the second digital signature is within a second threshold amount of a current timestamp.

Clause 14: The storage device of any one of Clauses 12 or 13, wherein in order to determine that the first digital signature and the second digital signature are combinable, the trusted circuit is configured to determine that a challenge value associated with the first digital signature and a challenge value associated with the second digital signature are a same challenge value.

Clause 15: The storage device of any one of Clauses 1 through 14, wherein the data stored in the plurality of data blocks comprises encrypted data.

Clause 16: A method, comprising: detecting a request to write data to one or more data blocks in storage circuitry of a storage device; computing a hash over the data to be written to the one or more data blocks; generating an anonymous digital signature for the data to be written to the one or more data blocks based at least in part on a private signing key stored in a trusted circuit of the storage device and the computed hash; and outputting the anonymous digital signature to a blockchain to evidence completion of the request to write the data to the one or more data blocks in storage circuitry of the storage device.

Clause 17: The method of Clause 16, further comprising: deriving a challenge value related to a most recent state of a blockchain associated with the data stored in the one or more data blocks; and generating a second anonymous signature based on the private signing key and the challenge value.

Clause 18: The method of Clause 17, wherein the blockchain is associated with a cryptocurrency.

Clause 19: The method of any one of Clauses 16 through 18, further comprising: generating a mapping between the computed hash and a range of memory addresses including memory addresses associated with the one or more data blocks; and committing the mapping to a hash-map store.

Clause 20: The method of Clause 19, further comprising: receiving, from a requesting device, a request to validate existence of data at a memory address; determining that the memory address is within the range of memory addresses specified in the mapping; and returning, to the requesting device, the computed hash associated with the range of memory addresses including the memory addresses associated with the one or more data blocks.

Clause 21: The method of any one of Clauses 16 through 20, further comprising: receiving a first digital signature for first data to be stored in the storage circuitry and a second digital signature for second data to be stored in the storage circuitry; determining, based on information associated with the first digital signature and the second digital signature, that the first digital signature and the second digital signature are combinable; and based on a determination that the first digital signature and the second digital signature are combinable, generating a combined signature for the first digital signature and the second digital signature.

Clause 22: A method, comprising: receiving, from a requesting device at trusted circuitry of a storage device, a request for a signature for data stored in a range of memory addresses in storage circuitry of the storage device, the request including a challenge value; retrieving a hash of the data stored in the range of memory addresses; signing the hash using the challenge value; and outputting the signed hash to the requesting device.

Clause 23: A system, comprising: a memory having executable instructions stored thereon; and a processor configured to execute the executable instructions to perform the operations of any one of Clauses 16 through 22.

Clause 24: A system, comprising: means for performing the operations of any one of Clauses 16 through 22.

Clause 25: A computer-readable medium having instructions stored thereon which, when executed by a processor, performs the operations of any one of Clauses 16 through 22.

Additional Aspects

Aspects of the subject matter described herein can be implemented in any suitable NAND flash memory, such as 3D NAND flash memory, as well as other types of semiconductor memory devices. Semiconductor memory devices include volatile memory devices, such as DRAM) or SRAM devices, NVM devices, such as ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration. The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, and C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "one or more of: A, B, or C" is intended to cover A, B, C, A-B, A-C, B-C, and A-B-C, as well as multiples of the same members (e.g., any lists that include AA, BB, or CC). Likewise, "one or more of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C"

is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A storage device, comprising:
   a storage circuitry configured to store a plurality of data blocks; and
   a trusted circuit having a private signing key securely stored thereon, the trusted circuit being configured to:
      compute a hash over data to be stored in one or more data blocks of the plurality of data blocks, and
      generate an anonymous digital signature for the data to be stored in the one or more data blocks based on a number of the one or more data blocks in which the data is to be stored, and based at least in part on the private signing key and the computed hash;
   wherein the generated anonymous digital signature evidences completion of a write operation of the data indicating that the data is stored in the one or more data blocks and prevents identification of the storage device,
   wherein the trusted circuit is interposed on a write path to the storage circuitry such that data written to the storage circuitry is processed through the trusted circuit, and
   wherein the generated anonymous digital signature is output to a blockchain.

2. The storage device of claim 1, wherein the trusted circuit is configured to generate the anonymous digital signature further based on a time at which the digital signature is generated.

3. The storage device of claim 1, wherein the trusted circuit is further configured to:
   derive a challenge value related to a most recent state of a blockchain associated with the data stored in the plurality of data blocks; and
   generate a second anonymous signature based on the private signing key and the challenge value.

4. The storage device of claim 3, wherein the blockchain is associated with a cryptocurrency.

5. The storage device of claim 1, wherein the trusted circuit is further configured to maintain a first mapping between a memory address range associated with the plurality of data blocks and the computed hash.

6. The storage device of claim 5, wherein the trusted circuit is further configured to:
   receive, from a requesting device, a request to validate existence of data at a memory address;
   determine that the memory address is within the memory address range associated with the plurality of data blocks; and
   return, to the requesting device, the computed hash.

7. The storage device of claim 5, wherein the trusted circuit is further configured to:
   receive, from a requesting device, a request to validate existence of data at a memory address;
   determine that the memory address is outside the memory address range associated with the plurality of data blocks;
   read, from the storage circuitry, data stored at the memory address;
   generate a second anonymous digital signature for the data stored at the memory address based on a hash of the data stored at the memory address and a signing key; and
   return, to the requesting device, the second anonymous digital signature.

8. The storage device of claim 6, wherein the trusted circuit is further configured to: generate a second mapping, the second mapping associating the memory address and the hash of the data stored at the memory address.

9. The storage device of claim 6, wherein the signing key comprises a challenge value included in the request to validate existence of data at the memory address.

10. The storage device of claim 5, further comprising:
    detecting, on the write path to the storage circuitry, a write request against an address in the memory address range associated with the plurality of data blocks; and
    deleting the first mapping between the memory address range associated with the plurality of data blocks and the computed hash based on detecting the write request.

11. The storage device of claim 1, wherein the trusted circuit is further configured to:
    receive a first digital signature for first data to be stored in the storage circuitry and a second digital signature for second data to be stored in the storage circuitry;
    determine, based on information associated with the first digital signature and the second digital signature, that the first digital signature and the second digital signature are combinable; and
    based on a determination that the first digital signature and the second digital signature are combinable, generate a combined signature for the first digital signature and the second digital signature.

12. The storage device of claim 11, wherein in order to determine that the first digital signature and the second digital signature are combinable, the trusted circuit is configured to:
    determine that a timestamp associated with the first digital signature differs from a timestamp associated with the second digital signature by an amount less than a first threshold amount, and
    determine that the timestamp associated with the first digital signature and the timestamp associated with the second digital signature is within a second threshold amount of a current timestamp.

13. The storage device of claim 11, wherein in order to determine that the first digital signature and the second digital signature are combinable, the trusted circuit is configured to determine that a challenge value associated with the first digital signature and a challenge value associated with the second digital signature are a same challenge value.

14. The storage device of claim 1, wherein the data stored in the plurality of data blocks comprises encrypted data.

15. A method, comprising:
   detecting a request to write data to one or more data blocks of a plurality of data blocks in storage circuitry of a storage device;
   computing a hash over the data to be written to the one or more data blocks;
   generating an anonymous digital signature for the data to be written to the one or more data blocks based on a number of the one or more data blocks in which the data is to be stored, and based at least in part on a private signing key stored in a trusted circuit of the storage device and the computed hash; and
   outputting the anonymous digital signature to a blockchain to evidence completion of the request to write the data to the one or more data blocks in storage circuitry of the storage device and prevents identification of the storage device, wherein the generated anonymous digital signature prevents identification of the storage device and wherein the trusted circuit is interposed on a write path to the storage circuitry such that data written to the storage circuitry is processed through the trusted circuit.

16. The storage device of claim 1, wherein the private signing key is permanently stored on the trusted circuit.

17. The method of claim 15, further comprising:
   deriving a challenge value related to a most recent state of a blockchain associated with the data stored in the one or more data blocks; and
   generating a second anonymous signature based on the private signing key and the challenge value.

18. The method of claim 17, wherein the blockchain is associated with a cryptocurrency.

19. The method of claim 15, further comprising:
   generating a mapping between the computed hash and a range of memory addresses including memory addresses associated with the one or more data blocks; and
   committing the mapping to a hash-map store.

20. The method of claim 19, further comprising:
   receiving, from a requesting device, a request to validate existence of data at a memory address;
   determining that the memory address is within the range of memory addresses specified in the mapping; and
   returning, to the requesting device, the computed hash associated with the range of memory addresses including the memory addresses associated with the one or more data blocks.

21. The method of claim 15, further comprising:
   receiving a first digital signature for first data to be stored in the storage circuitry and a second digital signature for second data to be stored in the storage circuitry;
   determining, based on information associated with the first digital signature and the second digital signature, that the first digital signature and the second digital signature are combinable; and
   based on a determination that the first digital signature and the second digital signature are combinable, generating a combined signature for the first digital signature and the second digital signature.

22. A storage device, comprising:
   a storage circuitry configured to store a plurality of data blocks; and
   a trusted circuit having a private signing key securely stored thereon, the trusted circuit being configured to:
      compute a hash over data to be stored in one or more data blocks of the plurality of data blocks; and
      generate an anonymous digital signature for the data to be stored in the one or more data blocks based at least in part on the private signing key, the computed hash, and the one or more data blocks in which the data is to be stored;
      receive a first digital signature for first data to be stored in the storage circuitry and a second digital signature for second data to be stored in the storage circuitry;
      determine, based on information associated with the first digital signature and the second digital signature, that the first digital signature and the second digital signature are combinable, wherein in order to determine that the first digital signature and the second digital signature are combinable, the trusted circuit is configured to determine that a challenge value associated with the first digital signature and a challenge value associated with the second digital signature are a same challenge value; and
      based on a determination that the first digital signature and the second digital signature are combinable, generate a combined signature for the first digital signature and the second digital signature,
   wherein the generated anonymous digital signature evidences completion of a write operation of the data indicating that the data is stored in the one or more data blocks and prevents identification of the storage device, and
   wherein the trusted circuit is interposed on a write path to the storage circuitry such that data written to the storage circuitry is processed through the trusted circuit.

* * * * *